Inventors
Harold E. Elliott
George C. Barton
By their Attorney

Inventors
Harold E. Elliott
George C. Barton
By their Attorney

Patented Jan. 17, 1950

2,494,694

UNITED STATES PATENT OFFICE 2,494,694

FASTENING INSERTING MACHINE

Harold Ernest Elliott and George Clifford Barton, Leicester, England, assignors to United Shoe Machinery Corporation, Flemington, N. J., a corporation of New Jersey Application January 9, 1948, Serial No. 1,326
In Great Britain January 15, 1947

20 Claims. (Cl. 1—18)

This invention relates to machines, such as fastening inserting machines of the type disclosed in Letters Patent of the United States No. 898,573 issued September 15, 1908, on an application filed in the name of George Goddu, for progressively operating along the edge of a work part such as a sole secured to a shoe. The linear configuration of the edge of a work part such as a sole is irregular and certain portions of the edge are of a pronounced linear curvature.

The manual guiding of the work part, which henceforth will be referred to as the sole, past the operating instrumentalities of the machine, therefore, is a rather difficult matter requiring considerable skill and experience on the part of the operator, particularly in view of the fact that the progress of the operating point about the periphery of the sole is of necessity rapid. Machines of this type are usually provided with an edge gage against which the edge face of the sole is held by the operator and which, therefore, determines the position of the sole forward and rearward of the machine. This position of the sole is of importance since the operating instrumentalities of the machine of the type referred to, such as for example an awl and a driver, are immovable forward and rearward of the machine. It is, of course, desirable that the operation, such as the nailing operation, proceed at a uniform distance from the sole edge resulting, in the illustrated example, in a desirable uniform spacing of the row of inserted nails from the sole edge. However, it has been found that even skilled workers at times experience difficulty, particularly when operating upon an edge portion of the sole of pronounced curvature, such as the edge of the heel seat portion, in maintaining continuous contact between the edge face of the sole and the edge gage. This has given rise to the thought to provide instead of an edge gage which is fixed on the machine frame, an edge gage which is movable forward or rearward in the machine and particularly an edge gage which is spring pressed forward so that on the operator's failure or inability continuously to maintain contact between the edge face of the sole and the edge gage, the edge gage is moved forward by its spring to retain the desired guiding contact with the edge face of the sole.

This, however, results, as may readily be seen, in locating portions of the sole edge operated upon in different positions forward or rearward of the machine so that nails would be inserted into the sole at nonuniform distances from the sole edge.

The purpose of the invention, therefore, is to overcome these difficulties in a machine organization of the above stated type in which the edge gage is spring pressed forward in the machine and may be pushed backward by the pressure of the work thereagainst and in which one of the operating instrumentalities, in the illustrated example the awl, is caused to pierce the work at a predetermined distance from the sole edge to make a nail receiving hole in the sole and then by a movement laterally of the machine to impart a feed motion to the work, locating finally the awl hole in the sole in the line of drive of the fastening inserting driver.

In accordance with one feature of the invention, therefore, there is made provision for moving the awl forward and rearward of the machine to enable the awl to participate in the forward and rearward movement of the edge gage and the work, the arrangement being particularly such that on return of the awl along the line of feed into initial position, the awl is accurately positioned forward or rearward of the machine by connections to the edge gage. Accordingly, the critical initial work piercing position of the awl is determined in accordance with whatever position the edge gage happens to be in. Since the awl can move forward or rearward, and indeed so moves on forward or rearward displacement of the sole, and furthermore since the driver is not movable forward or rearward of the machine, there is provided additional mechanism for positioning the awl at the end of its feed movement in alinement with the driver, irrespective of the position of the edge gage, so as to insure that the nail is inserted into the hole previously made in the sole by the awl.

It has been found desirable not only to provide mechanism for causing forward and rearward movement of the edge gage and the awl but also additional mechanism designed to insure that such movement always takes place in a direction perpendicular to the line of tangency at the point of contact of the edge gage with the sole edge. To this end and in accordance with another feature of the invention the edge gage, as well as the awl, are mounted on supports which are angularly adjustable about a center coinciding with the awl when the latter is in its work piercing position, there being provided power operated mechanism for so adjusting the edge gage support and the awl support angularly that the edge gage and the awl always move forward or rearward in a direction perpendicular to the line of tangency at the point of contact of the edge gage with the sole edge. Moreover, the operation of that mechanism for angularly adjusting the edge gage support and awl support is controlled by sole edge engaging feelers in accordance with the linear configuration of the sole edge.

These and other features of the invention will now be described in detail in connection with the appended drawings and will be pointed out in the claims.

In the drawings,

Fig. 16 is an inverted plan view of awl positioning parts shown in Fig. 5;

Fig. 17 is an angular view showing some of the parts shown in Figs. 1, 2 and 3;

The illustrated loose nailing machine is in general purpose and construction similar to the loose nailing machine disclosed in Letters Patent of the United States No. 898,573 issued September 15, 1908, on an application by George Goddu, and like that machine, the illustrated machine has a work piercing awl 10 and a nail driver 12 (Figs. 1 and 3) which are both carried by a swinging head 14. The swinging head is moved in one direction after the awl has pierced the work to cause the awl to feed the work and then is moved in the opposite direction, after the work has been fed and after the awl has been withdrawn from the work, to return the awl to its initial position. Moreover, there is provided a so-called foot plate 16 (Figs. 1 and 2) against which the work is pressed by a horn 18. Finally there is provided nail assorting and delivering mechanism also similar to that disclosed in the above mentioned patent.

Figure 1:
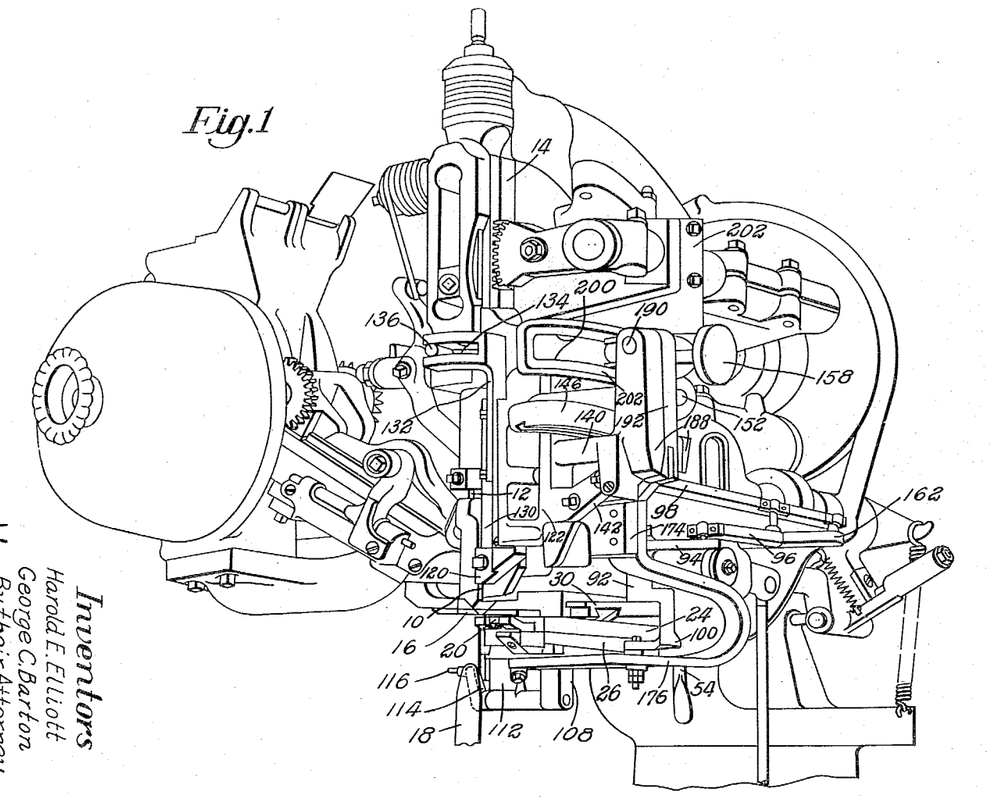
Fig. 1 is an angular view of the head of a loose nailing machine of the above identified type, in which machine the invention is illustrated as embodied.
Figure 2:
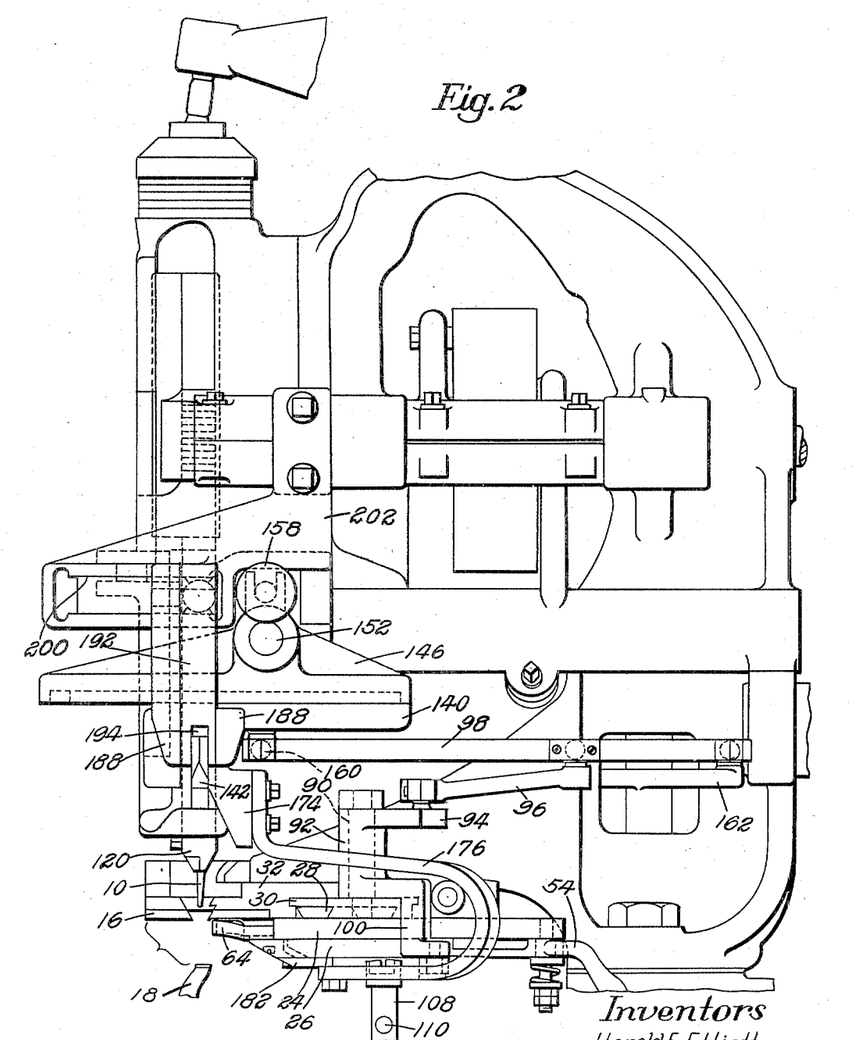
Fig. 2 is a right hand side elevation of the main portion of the machine head.
Figures 8, 9:
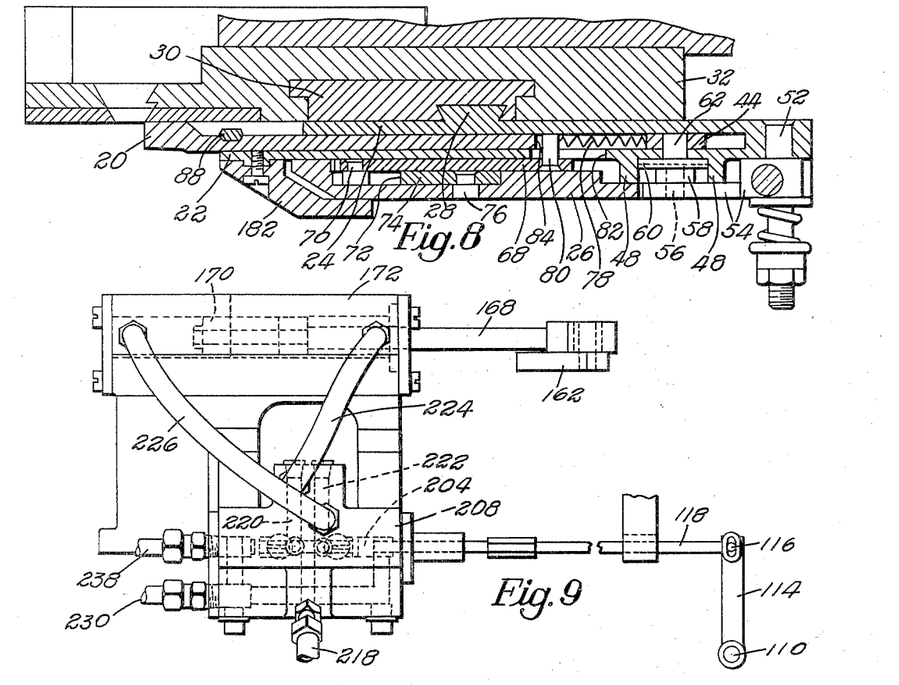
Fig. 8 is a section along the line VIII—VIII in Fig. 4.
Fig. 9 is a right hand side elevation of hydraulic mechanism for operating the mechanisms for swinging the edge gage and the awl support.

For the purpose of aiding the operator in guiding the work through the machine and obtaining a uniform spacing of the nails from the edge of the work regardless of irregular linear contour or configuration of the edge of the work there is provided an edge gage 20 (Figs. 1 to 5, 14 and 15) against which the edge face of the work, such as a sole on a shoe, is held by the operator and by which the work is positioned relatively to the awl. The edge gage 20 is arranged directly behind the awl 10, viewing the machine from the front, when the awl is in its work piercing position. The edge gage 20 has the form of a horizontal bar which is adjustably mounted in a guideway formed in a bar-shaped carrier 22. The carrier 22 is slidable forward and rearward of the machine in a guideway provided in the underside of a plate-like supporting bracket 24 (Figs. 2 and 8). The bracket 24 has secured to it a bottom plate 26 (Fig. 6) between which and the bracket the edge gage 20 and the carrier 22 are located. Provided on the upper face of the bracket 24 is a dove-tailed guiding tongue 28 (Figs. 4 and 8) which is curved concentric to the axis of the awl 10 when the latter is in its work piercing position. The tongue 28 is slidingly mounted in a correspondingly curved guideway formed in the underface of a rectilinearly and laterally adjustable slide 30. The slide 30 is mounted in a horizontal guideway formed in the underface of a fixed bracket 32 (Fig. 2). Lateral adjustment of the slide 30 causes the edge gage 20 and mechanism associated therewith to be adjusted in that direction. This adjustment is made by means of a thumb screw 34 (Fig. 4) which is threaded into the bracket 32. The thumb screw 34 has on it a pair of parallel flanges which embrace a lug 36 provided on the slide 30, the stem of the screw passing through the lug. Thus rotation of the screw 34 in one direction or the other causes corresponding adjustment of the edge gage 20 in one direction or the other and more specifically this mechanism enables the operator to adjust the edge gage 20 to be positioned directly behind the awl 10 when the awl is in its work piercing position.

It will be seen, therefore, that the edge gage 20 and its carrier 22 are movable forward and rearward of the machine in a rectilinear path and that they also may be angularly adjusted or swung in an arcuate path about the awl 10 as a center.

The edge gage 20 and its carrier 22 are urged forward in the machine by compression springs 38 (Fig. 5) which lie in recesses provided in the opposite sides of the carrier 22 and in the bracket 24. The springs 38 are confined between pins 40 extending downward from the bracket 24 into the recesses and lugs 42 extending laterally from the carrier 22. The lugs 42 are normally held by the springs 38 against the front ends of the recesses in the bracket 24 thus holding the edge gage 20 and the carrier 22 in their foremost position.

The edge gage 20 is adjustable in the carrier 22 with relation to the awl to determine the distance from the sole edge at which the nails are to be driven. For this purpose the edge gage 20 has at its rear end a head 44 (Fig. 5) which is provided with an inclined slot 46, the slot when viewed from above extending rearwardly from the right to the left of the head at an acute angle to the longitudinal median line of the edge gage. The carrier 22 has at its rear end a similar head 48 lying below the head 44. The head 48 also is provided with a slot 50 which, however, extends at right angles to the longitudinal median line of the edge gage 20. Provided on the bracket 24 is a downwardly extending stud 52 (Figs. 4 and 5) on which is pivoted a bell crank lever 54. One arm of the bell crank lever 54 is in the form of a hand lever by means of which the bell crank lever may be rotated to cause the edge gage 20 to be adjusted with relation to the carrier 22. The other arm of the bell crank lever 54 extends beneath the head 48 of the carrier 22 and carries an upwardly extending pin 56 (Fig. 8) on which is rotatably mounted a roll 58. The roll 58 engages in a groove provided in the underface of a block 60 and extending forward and rearward of the machine. The block 60 is arranged to slide laterally of the machine in a guideway formed in the underface of the head 48 on the carrier 22. The block 60 carries an upwardly extending pin 62 which passes through the slots 50 and 46. Thus when the hand lever arm of the bell crank lever 54 is moved forward by the operator, the roll 58 moves the block 60 from right to left (as viewed from the front of the machine) in the guideway in the head 48, the roll 58 moving forward in the groove provided in the block 60. Moreover, the pin 62 moves along the slots 46 and 50 and due to the angularity of the slot 46, the edge gage 20 is moved forward toward the awl. When the bell crank lever 54 is rotated in the opposite direction, the edge gage 20 is adjusted rearward.

The edge gage 20 and the carrier 22 are capable of being moved rearward by the pressure of the sole against the edge gage 20 and this movement takes place against the pressure of the two springs 38. When the edge gage 20 and the carrier 22 are so moved, the block 60, since it is connected by the pin 62 to the edge gage 20 and the carrier 22, moves rearward with relation to the roll 58 on the bell crank lever 54 irrespective of the position of the block laterally of the carrier 22. Accordingly, the adjustment of the edge gage with relation to the carrier is not affected by the rearward displacement of the edge gage under the pressure of the work.

Figures 5, 6, 7:
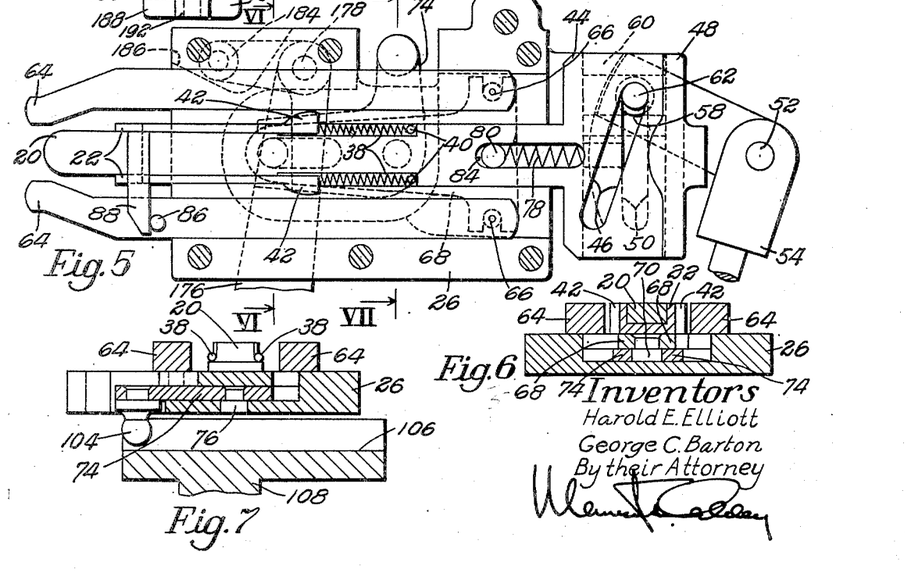
Fig. 5 is a plan view, partly in section, of the edge gage mechanism.
Fig. 6 is a section along the line VI—VI in Fig. 5.
Fig. 7 is a section along the line VII—VII in Fig. 5.
Figures 14, 15, 18:
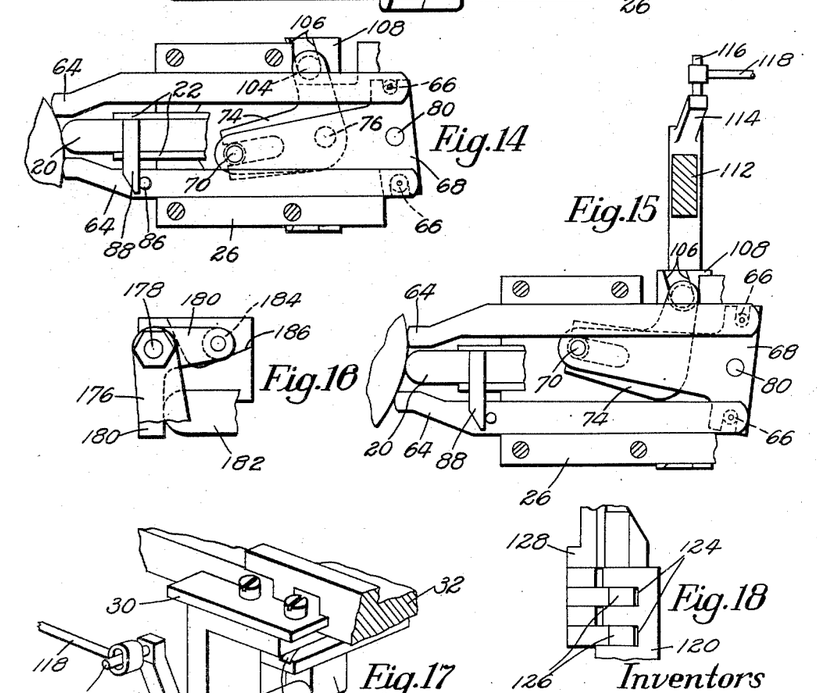
Fig. 14 is a plan view of some of the parts shown in Figs. 4 and 13 in a different position from that shown in those figures.
Fig. 15 is a plan view similar to Fig. 14 showing the parts in still another position.
Fig. 18 is a front elevation showing the connection between an awl bar and its actuator.

The edge gage supporting bracket 24 has formed on it at each side of and parallel to the guideway in which the carrier 22 is movable, two guideways in each of which is slidably supported a bar shaped feeler 64 (Figs. 5 and 14). The two feelers serve to control mechanism for causing the above mentioned angular adjustment of the bracket 24 and thus of the edge gage 20. The front ends of the feelers 64 are rounded and lie close to the edge gage 20, one at each side thereof. Normally the front ends of the feelers 64 lie a little forward of the front end of the edge gage 20. The feelers 64 are arranged to be pushed back by the sole as it is presented to the machine until the sole edge engages the edge gage 20. The feelers are, therefore, positioned by the sole forward and rearward of the machine and they can move forward and rearward during the operation of the machine relatively to the edge gage 20.

Figure 13:
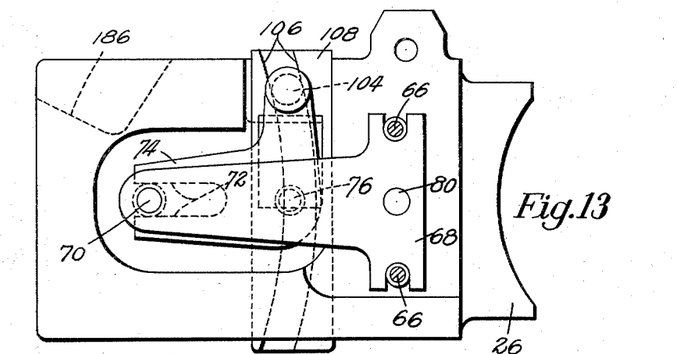
Fig. 13 is a plan view of some of the parts shown in Fig. 4.

The rear end portion of each feeler 64 carries a downward extending pin 66 (Figs. 5, 13 to 15) which engages an open ended slot in a head at the rear end of a T-shaped lever 68 (Fig. 13), the lever being supported by the bottom plate 26.

The front end portion of the lever 68 carries a downward extending pin 70 which engages an open ended slot 72 in one arm of a bell crank lever 74. The bell crank lever 74 is pivotally mounted on a pin 76 secured in the bottom plate 26. The other arm of the bell crank lever 74 extends to the left of the machine (as seen from the front) and is connected to a valve to be described, the valve serving to control hydraulic mechanism for swinging the edge gage about the awl as a center.

The lever 68 and thus both feelers 64 are urged forward by a compression spring 78 (Fig. 5). The forward end of the spring engages a pin 80 projecting upward from the center part of the head on the lever 68 through a slot 82 provided in the carrier 22. The edge gage 20 has in it a clearance slot 84 in which the spring 78 lies. Forward movement of the feelers 64 by the spring 78 is limited by the engagement of a pin 86 (Fig. 5) on the right hand feeler 64 with a lateral projection 88 on the edge gage 20.

If the two feelers 64 are moved simultaneously rearward, the lever 68 will move with them rearward without being turned about its pivot pin 80. The pin 70 at that time moves idly along the slot 72 in the bell crank lever 74 and, accordingly, does not affect the position of the bell crank lever. If, however, one of the feelers is moved rearward relatively to the other feeler, the lever 68 will be swung about its pivot pin 80, thereby causing the other feeler to move forward and also causing the bell crank lever 74 to swing about its pivot pin 76 with the result that the valve which is connected to the bell crank lever will be moved either forward or rearward to initiate the operation of the hydraulic mechanism.

If one of the feelers is moved rearward while the forward movement of the other feeler is resisted by contact with the sole edge, the lever 68 will then swing about the pin 66 on the latter feeler and the bell crank lever 74 will be swung by that movement of the lever 68 to operate the valve.

To repeat, if the work is thrust rearward with equal pressure against both feelers, the feelers will yield rearward without operating the valve. In case of relative movement between the two feelers 64, there will be brought about a swinging movement of the lever 68 and, therefore, of the bell crank lever 74, the result of which will be to operate the valve of the hydraulic mechanism. The operation of the hydraulic mechanism will cause the two feelers and the edge gage, since they are both carried by the bracket 24, to swing as a unit angularly about the awl as a center in such a manner that the direction of forward and rearward movement of the edge gage will be perpendicular to the line of tangency at the point of engagement of the edge gage with a curved portion of the sole edge.

Figure 4:
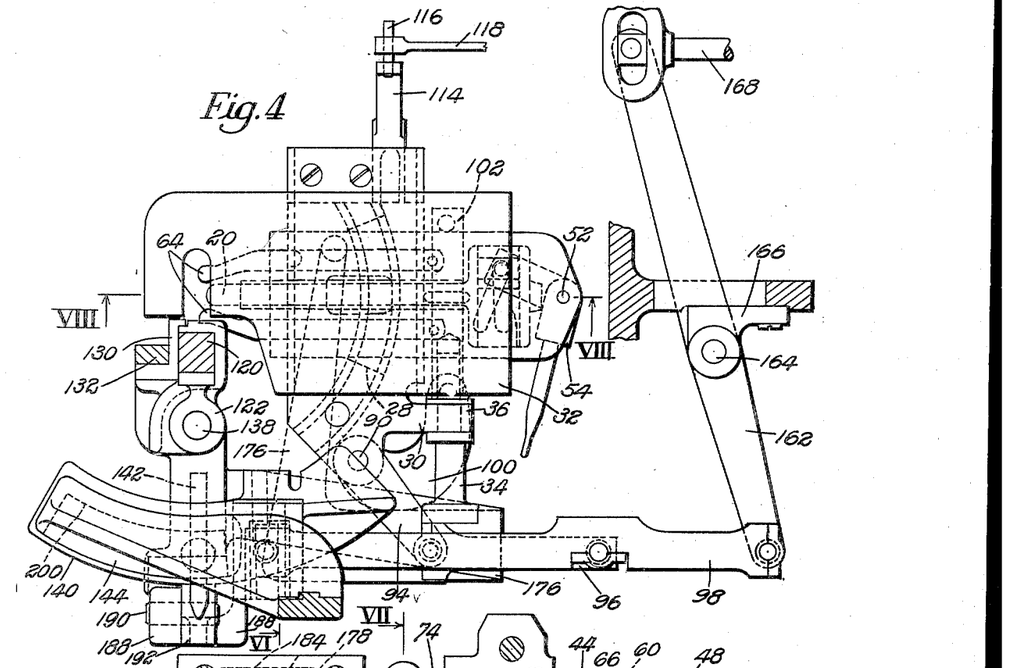
Fig. 4 is a plan view, partly in section, showing edge gage swinging mechanism and awl support swinging mechanism of the illustrated machine.

Referring now more specifically to the mechanism which, as a result of the operation of the hydraulic mechanism, causes the above mentioned angular adjustment of the edge gage mechanism, it will be noted from Figs. 2 and 4 that the slide 30 which carries the bracket 24 and thus the entire edge gage mechanism has on it a vertical spindle 90 on which is rotatably mounted a lever 92 serving to adjust the bracket 24 angularly with relation to the slide 30. The lever 92 has an arm 94 which is pivotally connected by a link 96 to a hydraulically operated rod 98, the rod being oscillated by the above mentioned hydraulic mechanism. The lever 92 also has a curved lower arm 100 which is pivotally connected by a link 102 to the edge gage bracket 24. When, therefore, the lever 92 is swung in a clockwise direction, as viewed from above, by the rod 98, the bracket 24 and with it the edge gage 20 and the feelers 64 are swung in a clockwise direction, as viewed from above, about the axis of the awl, the curved tongue 28 on the bracket 24 sliding in the curved guideway in the slide 30.

In view of the fact that upon angular adjustment of the edge gage mechanism the above mentioned bell crank lever 74 which is connected to the valve of the hydraulic mechanism is also angularly adjusted, provision must be made for so connecting the bell crank lever with the valve that the bell crank lever may be angularly adjusted without disturbing its connection to the valve. To this end, the bell crank lever 74 carries a downwardly extending stud 104 (Fig. 7) which has a ball portion on its lower end. The ball portion engages an arcuate guideway 106 which is concentric to the axis of the awl when the latter is in its work piercing position. This arcuate guideway 106 is formed in the head of an arm 108, which head is extended laterally of the machine. The arm 108 is secured on one end of a shaft 110 (Figs. 2, 3 and 17) rotatably mounted in a bracket 112 secured to the slide 30. The other end of the shaft has secured to it an arm 114 carrying a lateral pin 116 which passes through a hole in the front end of a rod 118. The rear end of the rod 118 is connected to the aforesaid valve. On adjustment of the slide 30 laterally of the machine, the pin 116 slides through the hole in the rod 118. When the edge gage bracket 24 is angularly adjusted, the ball portion of the stud 104 on the bell crank lever 74 travels along the arcuate guideway 106 in the head of the arm 108 but retains operative connection therewith. The arrangement is such that if one of the feelers is moved rearward under the thrust of the work thereagainst, the consequent swinging movement of the bell crank lever 74 will bring about a corresponding rocking movement of the arm 108 and shaft 110 which in turn will impart a corresponding forward or rearward movement to the rod 118. More specifically, when the left hand feeler is moved rearward, the edge gage bracket 24 will be swung towards the right (as seen from the front of the machine) but when the right hand feeler is moved rearward, the bracket will be swung towards the left.

The swinging movement of the edge gage bracket 24 in either direction will proceed until that feeler which has not been moved rearwardly by the work is brought to bear against the edge face of the sole with a pressure equal to that exerted by the work on the other feeler. When this condition is reached, the bell crank lever 74 will have been restored to its central position and the valve will have been moved back to its neutral position to cut off the further supply of pressure fluid to the hydraulic mechanism. The extent to which the edge gage bracket 24 is thus swung at any time is, therefore, dependent on the shape or curvature of that part of the sole edge which is then immediately in front of the two feelers. The result obtained is such that if the operator fails to hold the sole in the desired position in which the direction of forward or rearward movement of the edge gage is substantially perpendicular to the line of tangency at the point of contact of the edge gage with the sole edge, the edge gage bracket 24 will automatically be angularly adjusted to bring this desired condition about.

Consequently, the nails will always be inserted into the sole at a uniform distance from the sole edge. The arrangement is further such that the edge gage bracket 24 will remain in the position it occupied during the driving of the final nail into the sole when the sole is removed from the machine.

Referring now to the awl mechanism, it will be seen in Fig. 2 that the awl 10 is secured in the lower end of a bar 120 which is slidingly mounted in the left hand arm (as seen from the front of the machine) of a horizontal two armed lever 122 (Fig. 4). To permit relative movement between the awl bar 120 and its actuating mechanism, the upper end portion of the awl bar 120 has in it two horizontal recesses 124 (Fig. 18) which are engaged by tongues 126 extending laterally from the lower end of an awl bar actuator 128. The actuator 128 is vertically reciprocated in the above mentioned swinging head 14, as is well-known in machines of this type, by mechanism, also well-known, in time relation to the operation of the other operating instrumentalities of the machine. Specifically, the arrangement of the recesses 124 in the awl bar 120 and tongues 126 on the actuator 128 allows the awl bar to be moved in a horizontal direction with relation to the actuator 128, as will hereinafter appear, and yet to be raised and lowered by the actuator. The above mentioned awl supporting lever 122 has formed in it a vertical guideway in which the awl bar 120 is slidingly mounted and the awl bar is retained in that guideway by a plate 130 (Figs. 3 and 4) secured to the lever 122. The lever 122 has secured to it a vertical bar 132 having an offset portion in which is formed a groove 134. The groove 134 is engaged by a pin 136 secured in the swinging head 14. The purpose of this arrangement is to provide support for the lever 122 against downward movement while, however, allowing the lever to move horizontally.

Figure 3:
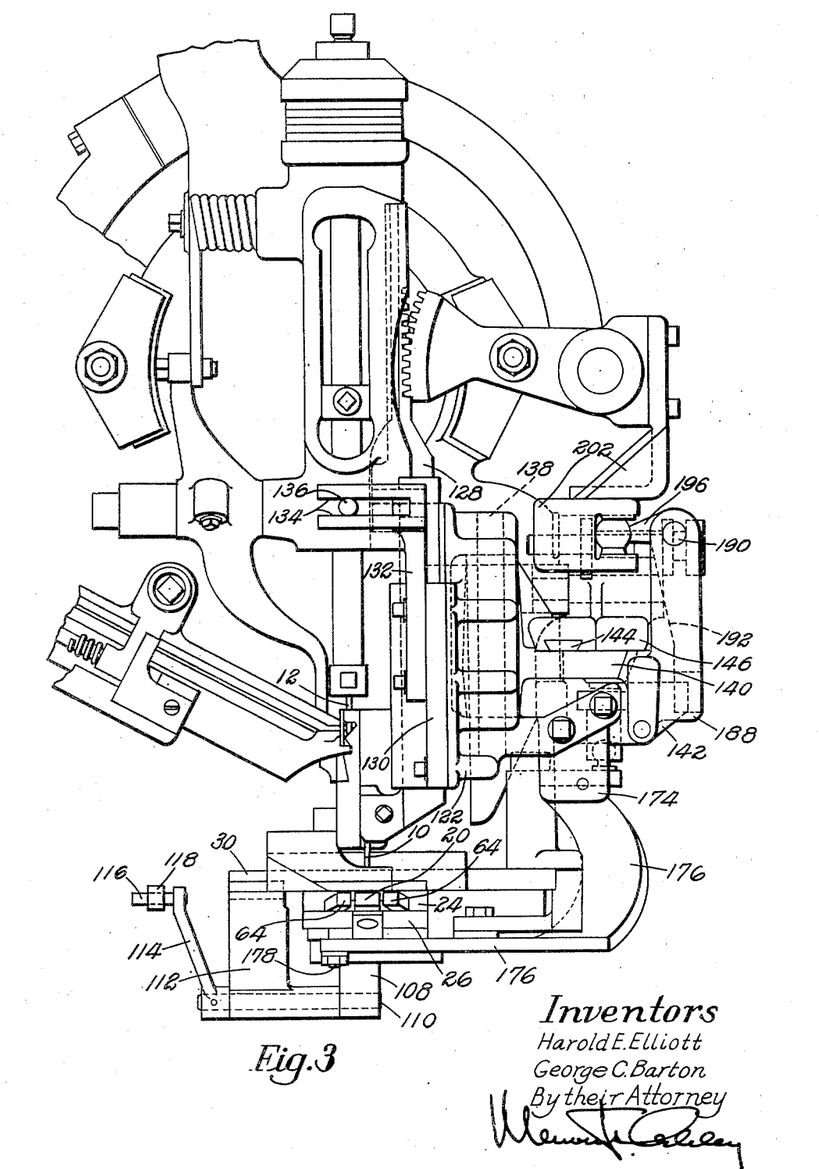
Fig. 3 is a front elevation of the main portion of the machine head.
Figures 19, 20:
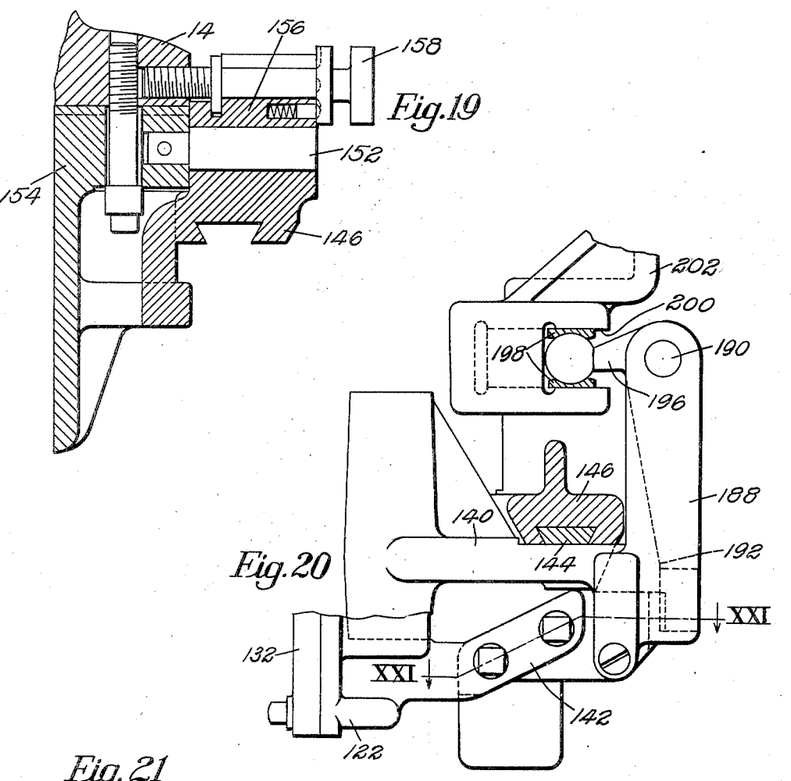
Fig. 19 is a front elevation, partly in section, of supporting means for an awl guiding member.
Fig. 20 is a front elevation, partly in section, of awl alining mechanism.

The horizontal movement of the lever 122, as a result of which the awl is moved forward or rearward of the machine, is a pivotal movement about a vertical shaft 138 (Figs. 3 and 4) which is positioned at the right of the awl bar 120 (as seen from the front of the machine). The shaft 138 is secured in an awl swinging bracket 140 (Figs. 2, 3 and 20). The lever 122 has a right hand arm 142, which, as will be described, serves to aline the awl in the path of movement of the driver at the end of a work feeding movement of the awl. The awl swinging bracket 140 has on its upper face a dovetailed arcuate guide member or tongue 144 which is concentric to the axis of the awl. The tongue 144 engages a correspondingly curved guideway in a block or bracket 146 (Figs. 1 to 3, 19 and 20) carried by the swinging head 14.

Figure 21:
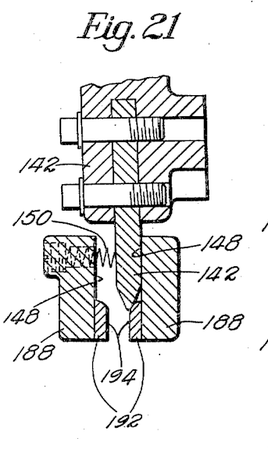
Fig. 21 is a section along the line XXI—XXI in Fig. 20.
Figure 22:
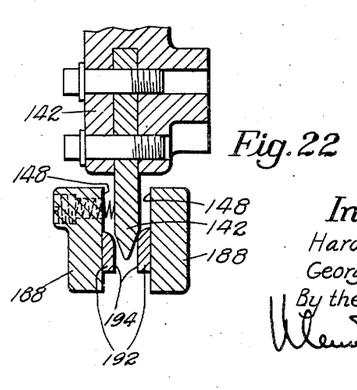
Fig. 22 is a view similar to Fig. 21 but showing the parts in a different relative position.

To limit forward and rearward movement of the awl in the machine, the above mentioned arm 142 of the awl supporting lever 122 has a tapered end portion which is positioned between two spaced vertical faces 148 (Figs. 21 and 22) provided on the awl swinging bracket 140. The distance between the faces 148 is sufficient to allow the lever 122 to swing to a limited extent in either direction about its shaft 138, thus permitting a limited forward or rearward movement of the awl. The arm 142 is normally held by a compression spring 150 against the rear face 148, the spring 150 being positioned between the arm 142 and the front face 148. Thus it will be seen that the awl is moved rearward against the pressure of the spring 150 and that the spring tends to move the awl forward. This movability of the awl is of advantage in that it permits the awl to move forward or rearward with the edge gage 20, the connections between the awl 10 and the edge gage 20 being hereinafter described.

The awl not only is movable forward and rearward in the machine, as just described, but its supporting mechanism, i. e. the bracket 140, is also angularly adjustable about a center coinciding with the awl when it is in its work penetrating position. Moreover, the awl supporting mechanism is adjustable rectilinearly along the line of feed. To this end the above mentioned block 146 with relation to which the awl carrying bracket 140 is angularly adjustable, may be adjusted along a horizontal spindle 152 (Figs. 2 and 19) secured in an arm 154, the arm itself being adjustably secured to the swinging head 14. The block 146 has on it a lug 156 in which is formed an open ended slot. A thumb screw 158 passes through the slot and is threaded into the swinging head 14. The thumb screw has two parallel flanges embracing the lug 156 so that rotation of the screw adjusts the block 146 and with it the awl mechanism (bracket 140, lever 122 and awl bar 120) laterally of the machine to determine the distance of the awl (when piercing the work) from the driver and, therefore, the spacing between successive nails driven into the work.

For the purpose of bringing about the angular adjustment of the awl mechanism, the bracket 140 has secured in it a downwardly extending, ball ended stud 160 (Fig. 2) to which is pivoted the front end of the above mentioned hydraulically operated rod 98. Thus on operation of the rod 98 to cause angular adjustment of the edge gage mechanism, as above described, the awl mechanism is adjusted simultaneously to the same extent and in the same direction.

The connections between the hydraulically operated rod 98 and the hydraulic mechanism are as follows: The rod 98 is connected by a ball joint to one end of a lever 162 (Fig. 4) which is pivoted on a vertical stud 164 secured in a bracket 166 fixed to the machine frame. The other end of the lever 162 is pivotally connected to the rod 168 of a hydraulically operated piston 170 (Fig. 9) which is reciprocated in a cylinder 172. The above mentioned valve which is operated by the feelers 64 controls the admission of pressure fluid to one end or the other of the cylinder to cause movement of the piston 170 in one direction or the other which, in turn, causes a swinging movement of the edge gage bracket 24 and the awl bracket 140. This simultaneous angular adjustment of the edge gage mechanism and the awl mechanism has the advantage that the rearward or forward movement of the awl always takes place substantially in the same direction as the rearward or forward movement of the edge gage.

As has already been stated, on return of the awl into initial position after a work feeding movement, the awl is positively adjusted forward or rearward in the machine in accordance with whatever position the edge gage may be in, forward or rearward of the machine, at that time. To this end the above mentioned arm 142 of the awl supporting lever 122 has on it a rearwardly extending lug 174 (Fig. 2) to which is rigidly secured a connecting member 176. The connecting member extends from the lug 174 rearward, then downward, then to the left and forward under the edge gage mechanism, this shape of the connecting member 176 providing clearance for the shoe and sole being operated upon. Pivotally secured to a vertical stud 178 (Figs. 3 and 16) in the left hand end portion of the connecting member 176 is a bell crank lever 180. One arm of the bell crank lever extends to the right and provides an abutment which is arranged to be engaged, when the awl is in its work penetrating position or when the awl is moving to the right toward that position, by the rounded rear end face of a block 182 which is secured to the underside of the edge gage 20. The other arm of the bell crank lever 180 extends forward and carries a cam roll 184 arranged to engage a cam face 186 provided on the bottom plate 26. This cam face, as seen in plane, is inclined rearwardly and to the right of the machine.

The engagement of the arms of the bell crank lever 180 with the cam face 186 and the block 182 results in the bell crank lever 180 occupying, at the end of the movement of the awl towards the right of the machine, a position forward and rearward in the machine which is determined by the position of the block 182 on the edge gage 20. When, for example, the edge gage has been positioned rearward by the work, the block 182 moves through the bell crank lever 180 the left hand end portion of the connecting member 176 rearward, the bell crank lever 180 being prevented from being moved about its pivot 178 by the engagement of the cam roll 184 with the cam face 186. Since the right hand end portion of the connecting member 176 is secured to the arm 142 of the awl supporting lever 122, the lever 122 is swung in a clockwise direction (as viewed from above) and the awl is moved rearward. This rearward movement of the awl, as already stated, takes place against the action of the spring 150 which tends to move the awl forward. Thus the awl comes to rest at the right hand limit of its travel along the line of feed, in a forward and rearward position, the distance of which from the edge gage remains constant in spite of the edge gage having possibly been displaced forward or rearward.

For the purpose of alining the awl at the end of its work feeding movement (i. e. movement toward the left of the machine) such that the awl and the hole made in the sole by the awl will be positioned in the path of movement of the driver, there is provided awl alining mechanism which will now be described. It has been mentioned that the right hand end portion of the arm 142 of the awl supporting lever 122 is tapered and extends between two spaced vertical faces 148 provided on the awl swinging bracket 140. More specifically, these faces 148 are formed on a pair of parallel lugs 188 (Figs. 20 to 22) on the bracket 140. The front one of these lugs is extended upward and has pivoted on a horizontal stud 190 (Fig. 20) an awl alining lever 192 (Figs. 1, 3 and 20). This lever 192 has a vertical arm which has in its lower end a recess 194 (Figs. 21 and 22) arranged to engage the tapered end of the arm 142 to aline the awl at the end of its work feeding movement. The recess 194 is of such a width that the arm 142 can just enter it and be accurately positioned thereby. The awl alining lever 192 has a second horizontal arm 196 provided with a ball shaped end which is engaged by two blocks 198. The blocks 198 are arranged to slide, when the bracket 140 is angularly adjusted, in a horizontal guideway 200 concentric to the awl axis. The guideway 200 is formed in a bracket 202 secured to the machine frame. The awl alining lever 192, on movement of the swinging head 14 to feed the work and thus on corresponding movement of the bracket 140, is canted about its pivot stud 198 by reason of the engagement of its arm 196 in the fixed guideway 200. As the lever 192 is so canted, its lower end portion moves at a more rapid speed than does the bracket 140 with the result that the recessed lower end portion of the lever 192 catches up with the tapered end of the arm 142. Thus the tapered end of the arm 142 becomes received within, and is positioned by the recess 194 in the awl alining lever 192 and, accordingly, the awl is alined as previously explained.

Referring now more specifically to the above mentioned hydraulic mechanism which is illustrated in Figs. 9 to 12 of the drawings, it will be noted that the above mentioned valve is in the form of a plunger valve 204 to which the aforesaid rod 118 is connected. The valve 204 is slidingly mounted in a valve chamber 206 formed in a valve block 208 which is secured to the above mentioned cylinder 172, the cylinder itself being secured to the machine frame.

Figure 12:
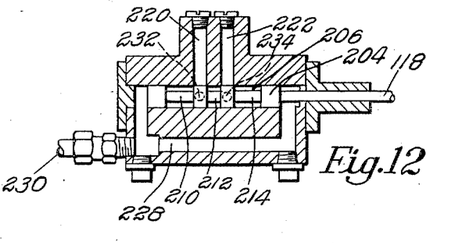
Fig. 12 is a section along the line XII—XII in Fig. 10.

The valve 204 has three reduced portions 210, 212, and 214 (Fig. 12) which are spaced equal distances from each other. The valve block 208 has formed in it an inlet passage 216 (Fig. 11) which communicates at one end with the valve chamber 206 and at the other end with a pipe 218 threaded into the inlet passage 216 and connected to an oil pump (not shown). The valve block 208 also has formed in it two passages 220, 222 (Figs. 9 and 12). The passage 220 is connected by a pipe 224 to one end of the cylinder 172, and the passage 222 is connected by a pipe 226 to the other end of the cylinder 172.

The valve block 20 has in it a passage 228, the ends of which communicate with the valve chamber 206 at each end of the valve 204 and a pipe 230 communicates with the passage 228. The passage 228 and the pipe 230 are arranged to drain away any oil which may escape past the ends of the valve 204.

The inlet passage 216 communicates with the reduced portion 212 of the valve 204 and when the valve is moved in one direction or the other from its neutral or closed position, oil under pressure may flow along the passage 220 and pipe 224 to one end of the cylinder 172 or along the passage 222 and pipe 226 to the other end of the cylinder 172.

Figure 10:
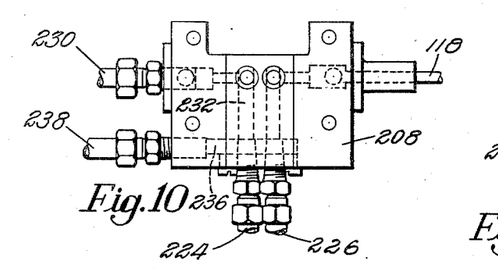
Fig. 10 is a plan view of some of the parts shown in Fig. 9.
Figure 11:
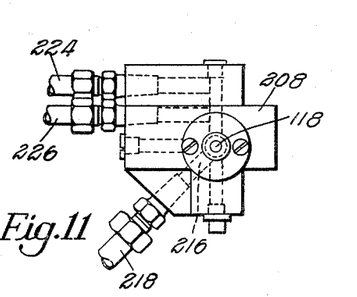
Fig. 11 is a right hand side elevation of some of the parts shown in Fig. 9.

The valve block 208 has formed in it two exhaust passages 232 and 234 which communicate with the valve chamber 206 and with a passage 236 in which is secured an exhaust pipe 238 (Fig. 10).

When the valve 204 is moved to the right from its neutral position (shown in Fig. 12), oil under pressure will flow up the passage 222 and along the pipe 226 to move the piston 170 to the right in Fig. 9. This opens the exhaust passage 232 and oil from the other end of the cylinder 172 will flow down the pipe 224 and passages 220 and 232 to the exhaust pipe 238. When the valve 204 is moved to the left from its neutral position, oil under pressure will flow up the passage 220 and pipe 224 to move the piston 170 to the left in Fig. 9 and oil will flow from the left hand end of the cylinder 172 down the pipe 226 and passages 222 and 234 to the exhaust pipe 238.

The operation of the machine will now be described. It is to be understood that, as usual, the driving mechanism of the machine includes a clutch (not shown) which normally is disengaged so that the machine may run idle. With the machine idling, however, the above mentioned oil pump is driven to cause oil under pressure to be available for admission by the valve 204 to one end or the other of the cylinder 172. To initiate a cycle of operations the clutch is tripped by the depression of a treadle (not shown) and this cycle may be repeated indefinitely so long as the treadle is kept depressed. One nail is inserted during each cycle of operations.

Before considering more closely the sequence of events during one cycle of operations it should be noted that in the inoperative position of the operating instrumentalities of the machine the awl 10 is up and at the right hand limit of its back and forth movement along the line of feed. The awl is ready to descend and pierce the work and its position forward or rearward of the machine is determined in accordance with the position of the edge gage 20 through the agency of the above described connections between the awl mechanism and the edge gage mechanism, these connections including the block 182 on the edge gage, the bell crank lever 180, the connecting member 176, and the awl supporting lever 122. The edge gage is spring pressed forward and the feelers 64 will be located a little forward of the edge gage. The valve 204 will be closed assuming that the edge portion of the work piece last operated upon was straight. In this case, the edge gage mechanism and awl mechanism will be at the left and rearward ends of their swinging movements, that is at the ends of their counterclockwise movement (when viewed from above) the edge gage will extend substantially at right angles to the line of feed. If, however, the edge portion of the work piece last operated upon was curved, the edge gage mechanism and awl mechanism will have been moved angularly from their above mentioned end position and one of the feelers will extend further forward than the other.

The work piece, in the illustrated example a shoe with a sole to be nailed thereon, is placed on the horn 18 and moved rearward of the machine until its rear edge face engages the edge gage. Assuming the edge portion of the sole first to be operated upon to be substantially straight, both feelers 64, provided they are spaced uniform distances from the line of feed, will be moved rearward during and as a result of the rearward movement of the work piece. Since no relative movement takes place between the feelers 64, the valve 204 remains closed and the edge gage mechanism and awl mechanism remain in their initial positions of angular adjustment. Should, however, one of the feelers 64 be positioned further forward than the other, then the frontmost feeler alone will be pushed rearward relatively to the other, the valve 204 will be moved out of its initial neutral position, and the hydraulically operated mechanism will be operated to adjust the edge gage mechanism and awl mechanism angularly until the rearmost feeler also engages the work piece and the feelers are brought into such a relative position that the valve is closed. Preferably, the edge gage, when the work is being positioned in the machine, is pushed rearward somewhat against the pressure of its springs 38, thus providing a "live" edge gage. Rearward displacement of the edge gage, of course, causes similar rearward movement of the awl due to the above described connections between the edge gage mechanism and awl mechanism.

The work piece having been positioned, the horn 18 is allowed to rise to clamp the work piece against the foot plate 16 whereupon the clutch is tripped. The awl descends to pierce the work and as a result of the then ensuing movement of the swinging head 14 toward the left of the machine, the awl is moved in the same direction while remaining in piercing engagement with the sole, thereby imparting a feed movement to the work. As in machines of this type, the horn 18 is automatically lowered somewhat just before the beginning of the feed movement so as to release the work piece from clamping engagement with the foot plate 16 during the feeding interval.

As the work piece is being fed by the awl, the operator continues to hold its edge face against the edge gage, turning the work piece if curved portions of the edge are being operated upon. These curved portions may cause one or the other of the two feelers 64 to move rearward and thus operate the valve 204 with the result that the edge gage mechanism and awl mechanism are so angularly adjusted that the forward or rearward movements of the edge gage and the awl always take place in a direction perpendicular to the line of tangency at the point of contact of the edge gage with the sole edge. Since the edge gage is normally immovable along the line of feed and since the awl in feeding the work moves toward the left of the machine along the line of feed, the awl connections with the edge gage, particularly the bell crank lever 180, move away from the edge gage and the awl is free to follow forward or rearward movement of the work piece if any such movement should take place. During the work feeding operation the edge gage may be moved rearward by the work piece or it may be moved forward by its springs 38 so that the engagement of the edge face of the sole with the edge gage is maintained with less skill and attention on the part of the operator than if the edge gage were fixed in the machine.

Toward conclusion of the work feeding motion of the awl, the awl alining lever 192 becomes operative, as described, to engage and position the arm 142 of the awl supporting lever 122, thus alining the awl and the awl hole in the work piece with the path of movement of the driver, irrespective of the position of the edge gage forward or rearward of the machine. The horn 18 rises again to clamp the work, the awl is withdrawn and begins its backward motion along the line of feed. The driver descends and drives a nail into the awl hole made in the sole. As the awl completes its return motion toward the right of the machine, the bell crank lever 180 of the mechanism connecting the awl with the edge gage again cooperates with the block 182 on the edge gage and the cam face 186 to position the awl forward or rearward of the machine in accordance with the position of the edge gage.

Having thus described our invention, what we claim as new and desire to secure by Letters Patent of the United States is:

1. In a machine for progressively operating along the edges of work parts, including edge portions of pronounced linear curvature, a movable edge gage, an edge gage support, means tending to move the edge gage forward in the machine so as to maintain contact with the edge of a work part presented to the machine, and automatically operative means for angularly adjusting the edge gage support out of the position it occupies, upon variation of the linear configuration of the edge of the work part.

2. In a machine for progressively operating along the edges of work parts, including edge portions of pronounced linear curvature, a movable edge gage, an edge gage support, a spring tending to move the edge gage forward in the machine and with relation to its support so as to cause the edge gage to maintain contact with the edge of a work part presented to the machine, and automatically operative means for angularly adjusting the edge gage support in accordance with the linear configuration of the edge of the work part to cause the edge gage always to move in a direction perpendicular to the line of tangency at the point of contact of the edge gage with the edge of the work part.

3. In a machine for progressively operating along the edges of work parts, including edge portions of pronounced linear curvature, a movable edge gage, an edge gage support, means tending to move the edge gage forward in the machine so as to cause the edge gage to maintain contact with the edge of a work part presented to the machine, means for angularly adjusting the edge gage support to cause the edge gage always to move in a direction perpendicular to the line of tangency at the point of contact of the edge gage with the edge of the work part, and work edge contacting feelers for controlling the operation of said adjusting means in accordance with the linear configuration of the edge of the work part.

4. In a machine for progressively operating along the edges of work parts, including edge portions of pronounced linear curvature, a movable edge gage, an edge gage support, a spring tending to move the edge gage forward in the machine and with relation to its support so as to cause the edge gage to maintain contact with the edge of a work part presented to the machine, means for angularly adjusting the edge gage support to cause the edge gage always to move in a direction perpendicular to the line of tangency at the point of contact of the edge gage with the edge of the work part, and work edge contacting feelers for controlling the operation of said adjusting means in accordance with the linear configuration of the edge of the work part.

5. In a machine for progressively operating along the edges of work parts, including edge portions of pronounced linear curvature, a movable edge gage, an edge gage support, a work feeding member adapted to engage a work part at a predetermined point thereof and then to feed the work part while retaining contact with that point, means tending to move the edge gage forward in the machine so as to cause the edge gage to maintain contact with the edge of the work part, and automatically operative means for angularly adjusting the edge gage support about said point to cause the edge gage always to move in a direction perpendicular to the line of tangency at the point of contact of the edge gage with the edge of the work part.

6. In a machine for progressively operating along the edges of work parts, including edge portions of pronounced linear curvature, a movable edge gage, an edge gage support, a work feeding member adapted to engage a work part at a predetermined point thereof and then to feed the work part while retaining contact with that point, a spring tending to move the edge gage forward in the machine and with relation to its support so as to cause the edge gage to maintain contact with the edge of the work part, and automatically operative means for angularly adjusting the edge gage support about said point in accordance with the linear configuration of the edge of the work part to cause the edge gage always to move in a direction perpendicular to the line of tangency at the point of contact of the edge gage with the edge of the work part.

7. In a machine for pregressively operating along the edges of work parts, including edge portions of pronounced linear curvature, a movable edge gage, an edge gage support, a work feeding member adapted to engage a work part at a predetermined point thereof and then to feed the work part while retaining contact with that point, means tending to move the edge gage forward in the machine so as to cause the edge gage to maintain contact with the edge of the work part, means for angularly adjusting the edge gage support about said point to cause the edge gage always to move in a direction perpendicular to the line of tangency at the point of contact of the edge gage with the edge of the work part, and work edge contacting feelers for controlling the operation of said adjusting means in accordance with the linear configuration of the edge of the work part.

8. In a fastening inserting machine, a work piercing and work feeding awl, an edge gage adapted to move forward or rearward in the machine, and connections between the edge gage and the awl adapted to move the awl forward or rearward in the machine on forward or rearward movement of the edge gage.

9. In a fastening inserting machine, a work piercing and work feeding awl, an awl support, a movable edge gage, an edge gage support, means tending to move the edge gage forward in the machine so as to cause the edge gage to maintain contact with the edge of a work part presented to the machine, automatically operative means for angularly adjusting the edge gage support in accordance with the linear configuration of the edge of the work part, connections between the edge gage and the awl adapted to move the awl forward or rearward of the machine in accordance with the position of the adge gage forward or rearward of the machine, and connections between said adjusting means and the awl support, said connections being adapted to adjust the awl support angularly on angular adjustment of the edge gage support.

10. In a fastening inserting machine, a work piercing and work feeding awl, an awl support, a movable edge gage, an edge gage support, a spring tending to move the edge gage forward in the machine and with relation to its support so as to cause the edge gage to maintain contact with the edge of a work part presented to the machine, means for angularly adjusting the edge gage support to cause the edge gage always to move in a direction perpendicular to the line of tangency at the point of contact of the edge gage with the edge of the work part, connections between the edge gage and the awl adapted to move the awl forward or rearward of the machine in accordance with the position of the edge gage forward or rearward of the machine, connections between said adjusting means and the awl support adapted to adjust the awl support angularly on angular adjustment of the edge gage support, and work edge contacting feelers for controlling the operation of said adjusting means in accordance with the linear configuration of the edge of the work part.

11. In a fastening inserting machine, a fastening inserting driver, an awl adapted in its initial position to pierce the work and then to initiate a feed movement of the work, an awl support, an edge gage movable forward and rearward of the machine, means for causing movement of the awl forward and rearward of the machine with such movements of the edge gage, and means, the operation of which is controlled in accordance with the linear configuration of the edge of the work part operated upon, for angularly adjusting the edge gage and the awl support about a center coinciding with the awl when the latter is in its initial work piercing position.

12. In a fastening inserting machine, a fastening inserting driver, an awl adapted in its initial position to pierce the work and then to initiate a feed movement of the work, an awl support, an edge gage movable forward and rearward of the machine, means for causing movement of the awl forward and rearward of the machine with relation to its support and in accordance with such movements of the edge gage, and means for angularly adjusting the edge gage and the awl support about a center coinciding with the awl when in its initial work piercing position, and work edge contacting feelers for controlling the operation of said adjusting means in accordance with the linear configuration of the edge of the work part.

13. In a fastening inserting machine, a fastening inserting driver, an awl adapted in its initial position to pierce the work and then to feed the work, means for moving the awl laterally of the machine first in one direction to feed the work and then in the opposite direction back to its initial position, an awl support, an edge gage movable forward and rearward of the machine, means for causing movement of the awl forward and rearward of the machine and with relation to its support on return of the awl into its initial position, connections between the edge gage and the awl to determine the direction and extent of forward or rearward movement of the awl, and means, the operation of which is controlled in accordance with the linear configuration of the edge portion of the work part operated upon for angularly adjusting the edge gage and the awl support about a center coinciding with the awl when the latter is in its initial work piercing position.

14. In a fastening inserting machine, a fastening inserting driver, an awl adapted in its initial position to pierce the work and then to feed the work, means for moving the awl laterally of the machine first in one direction to feed the work and then in the opposite direction back to its initial position, an awl support, an edge gage movable forward and rearward of the machine, means for causing movement of the awl forward and rearward of the machine and with relation to its support on return of the awl into its initial position, connections between the edge gage and the awl to determine the direction and extent of forward or rearward movement of the awl, means for angularly adjusting the edge gage and the awl support about a center coinciding with the awl when the latter is in its initial work piercing position, and work edge contacting feelers for controlling the operation of said adjusting means in accordance with the linear configuration of the edge of the work part.

15. In a fastening inserting machine, a work piercing and work feeding awl, an edge gage adapted to move forward or rearward in the machine on forward or rearward displacement of a work part presented to the machine, and means permitting free movement of the awl forward or rearward of the machine as a result of the forward or rearward displacement of the work.

16. In a fastening inserting machine, a work piercing and work feeding awl, an awl support, an edge gage adapted to move forward and rearward in the machine, an edge gage support, a spring tending to move the edge gage forward in the machine, connections between the edge gage and the awl adapted to move the awl forward in accordance with the position of the edge gage forward of the machine, hydraulically operated mechanism for adjusting the edge gage support and the awl support angularly, a valve controlling the operation of the hydraulic mechanism, and work edge engaging feelers for controlling the setting of the valve.

17. In a fastening inserting machine, a fastening inserting driver, an awl adapted in its initial position to pierce the work and then to feed the work, means for moving the awl laterally of the machine first in one direction to feed the work and then in the opposite direction back to its initial position, an awl support, an edge gage movable forward and rearward of the machine, means for causing movement of the awl forward or rearward of the machine on return of the awl into initial position, connections between the edge and the awl to determine the extent of the forward or rearward movement of the awl, hydraulically operated mechanism for adjusting the the edge gage support and awl support angularly about a center coinciding with the awl when the latter is in its initial position, a valve controlling the operation of the hydraulically operated mechansim, and work edge engaging feelers associated with the edge gage and adapted to control the setting of the valve in accordance with the linear configuration of the work edge.

18. In a fastening inserting machine, a fastening inserting driver, an awl means for reciprocating the awl along the line of feed between an initial work piercing position and a final position in which the work feeding movement of the awl is concluded, an edge gage movable forward and rearward of the machine, means active when the awl is in its initial position for positioning the awl forward or rearward of the machine in accordance with the position of the edge gage, and means active on movement of the awl into its said final position for positioning the awl in alinement with the path of movement of the driver.

19. In a fastening inserting machine, a fastening inserting driver, an awl, means for reciprocating the awl along the line of feed between an initial work piercing position and a final position in which the work feeding movement of the awl is concluded, an edge gage movable forward and rearward of the machine, means active when the awl is in its initial position for positioning the awl forward or rearward of the machine in accordance with the position of the edge gage, means active on movement of the awl into its said final position for positioning the awl in alinement with the path of movement of the driver, an edge gage support, an awl support, and means for adjusting the edge gage support and the awl support angularly about a center coinciding with the awl when the latter is in its said initial position.

20. In a fastening inserting machine, a fastening inserting driver, an awl, means for reciprocating the awl along the line of feed between an initial work piercing position and a final position in which the work feeding movement of the awl is concluded, an edge gage movable forward and rearward of the machine, means active when the awl is in its initial position for positioning the awl forward or rearward of the machine in accordance with the position of the edge gage, means active on movement of the awl into its said final position for positioning the awl in alinement with the path of movement of the driver, an edge gage support, an awl support, hydraulically operated mechanism for adjusting the edge gage support and the awl support angularly about a center coinciding with the awl when the latter is in its initial position, a valve controlling the operation of the hydraulic mechanism, and work edge engaging feelers associated with the edge gage and adapted to control the setting of the valve in accordance with the linear configuration of the work edge.

HAROLD ERNEST ELLIOTT.
GEORGE CLIFFORD BARTON.

REFERENCES CITED

The following references are of record in the file of this patent:

UNITED STATES PATENTS

| Number | Name | Date |
| --- | --- | --- |
| 2,249,784 | Robinson | July 22, 1941 |